United States Patent

Nowak et al.

Patent Number: 6,023,286
Date of Patent: Feb. 8, 2000

[54] MOVING MIRROR MOTION QUALITY COMPENSATION

[75] Inventors: William J. Nowak, Webster; James J. Appel, Rochester; Edward C. Bock, Webster, all of N.Y.

[73] Assignee: Xerox Corporation, Stamford, Conn.

[21] Appl. No.: 09/004,762

[22] Filed: Jan. 8, 1998

[51] Int. Cl.[7] .................................. B41J 2/47; H04N 1/21
[52] U.S. Cl. .......................... 347/256; 347/129; 347/257; 347/260
[58] Field of Search ...................................... 347/153, 118, 347/129, 241, 256, 243, 244, 240, 251, 134, 257, 260; 346/150.1, 107.3, 107.5, 45; 399/202, 118; 358/497, 296, 300, 302, 481

[56] References Cited

U.S. PATENT DOCUMENTS

| | | | |
|---|---|---|---|
| 4,750,045 | 6/1988 | Ohara et al. | 358/481 X |
| 5,315,321 | 5/1994 | Peled et al. | 347/241 X |
| 5,412,409 | 5/1995 | Costanza | 347/118 |
| 5,498,869 | 3/1996 | Appel et al. | 250/236 |
| 5,610,652 | 3/1997 | Suzuki | 347/256 |
| 5,638,109 | 6/1997 | Agano | 347/251 |
| 5,674,656 | 10/1997 | Maniar | 430/137 |
| 5,724,087 | 3/1998 | Sugano et al. | 347/243 |
| 5,805,296 | 9/1998 | Hattori | 358/300 |

Primary Examiner—Susan S. Y. Lee
Attorney, Agent, or Firm—John M. Kelly

[57] ABSTRACT

Correcting motion quality induced color banding problems resulting from photoreceptor motion defects in a color imaging device having a laser based multifaceted polygon and a rotating cylindrical mirror whose rotation is set by a controlled rotation inducing element. A motion sensor senses the motion of the photoreceptor. Based upon motion errors a controller either advances or delays the production of a latent image. The controller further controls the rotation inducing element, beneficially a piezoelectric element, such that a latent image is produced in a predetermined location. When multiple latent images are produced, the controller beneficially causes the latent images to be properly registered.

10 Claims, 3 Drawing Sheets

… (6,023,286)

MOVING MIRROR MOTION QUALITY COMPENSATION

FIELD OF THE INVENTION

This invention relates to imaging devices having a rotating, multifaceted polygon scanner that raster scans a photoreceptor. In particular, this invention relates to reducing image defects caused by motion defects of the photoreceptor.

BACKGROUND OF THE INVENTION

Electrophotographic marking is a well known and commonly used method of copying or printing documents. Electrophotographic marking is performed by exposing a light image representation of a desired document onto a substantially uniformly charged photoreceptor. In response to that light image the photoreceptor discharges, creating an electrostatic latent image of the desired document on the photoreceptor's surface. Toner particles are then deposited onto that latent image, forming a toner image. That toner image is then transferred from the photoreceptor onto a substrate such as a sheet of paper. The transferred toner image is then fused to the substrate, usually using heat and/or pressure, thereby creating a copy of the desired image. The surface of the photoreceptor is then cleaned and recharged for the production of another image.

The foregoing broadly describes a prototypical black and white electrophotographic printing machine. Electrophotographic marking can also produce color images by repeating the above process once for each color of toner used to make the composite color image. The various color toners can then be transferred onto a substrate in a superimposed registration such that a desired composite color image results. That composite color image can then be fused to make a permanent image.

One way of exposing the photoreceptor is to use a Raster Output Scanner (ROS). A ROS is typically comprised of a laser light source (or sources) and a rotating polygon having a plurality of mirrored facets. The light source radiates a laser beam onto the polygon facets and the facets then reflect the beam onto the photoreceptor, producing a light spot. As the polygon rotates the spot traces lines, referred to as scan lines, on the photoreceptor. By moving the photoreceptor as the polygon rotates the surface of the photoreceptor is raster scanned by the spot. During scanning, the laser beam is modulated with image information so as to produce a predetermined latent image on the photoreceptor. For color printing, by repeating the raster scanning to create a latent image for each color of toner a predetermined color image is produced.

While raster output scanning is successful, it has problems. For example, in color electrophotographic printing it is very important that the various color images are properly registered. By registration it is meant that the latent images are created at predetermined locations on the photoreceptor such that when the various latent images are developed and transferred onto a substrate that the proper final composite image results. Specifically important to the present invention is the fact that the motion of the photoreceptor is not perfect. Vibration, motor backlash, gear train interactions, mechanical imbalances, friction, among other factors, cause the instantaneous position of the photoreceptor to be less than ideal. Therefore, without compensation, the scan lines of the various images are not fully registered.

Color print testing performed at Xerox has proven that motion quality problems result in a color defect that is referred to herein as motion quality induced color banding. Color banding itself is a term given to any color image to color image misregistration. Because motion quality induced color banding is detrimental to print quality a technique of reducing or eliminating motion quality induced color banding would be beneficial.

SUMMARY OF THE INVENTION

This invention relates to a technique of reducing or eliminating motion quality induced color banding in a composite color image that is derived from a plurality of superimposed raster scanned color images. According to the principles of the present invention the motion of the photoreceptor is monitored. The results of that monitoring are used to compensate for motion defects by causing the position of the scan line to move on the photoreceptor such that it is at the proper position. Scan line position adjustments are brought about using a rotating cylinder mirror in the raster output scanner. Also included is a voltage controlled piezoelectric element that either expands or contracts, depending upon the applied voltage. The expansion or contractions of the piezoelectric element is coupled to the rotating cylinder mirror. The expansion or contraction of the piezoelectric element then causes the cylinder mirror to move, which in turn causes the position of the scan line on the photoreceptor to move to compensate for motion defects.

BRIEF DESCRIPTION OF THE DRAWINGS

Other aspects of the present invention will become apparent as the following description proceeds and upon reference to the following drawings, in which like reference numerals identify like elements and wherein.

DETAILED DESCRIPTION OF A PREFERRED EMBODIMENT OF THE INVENTION

Figure 1:
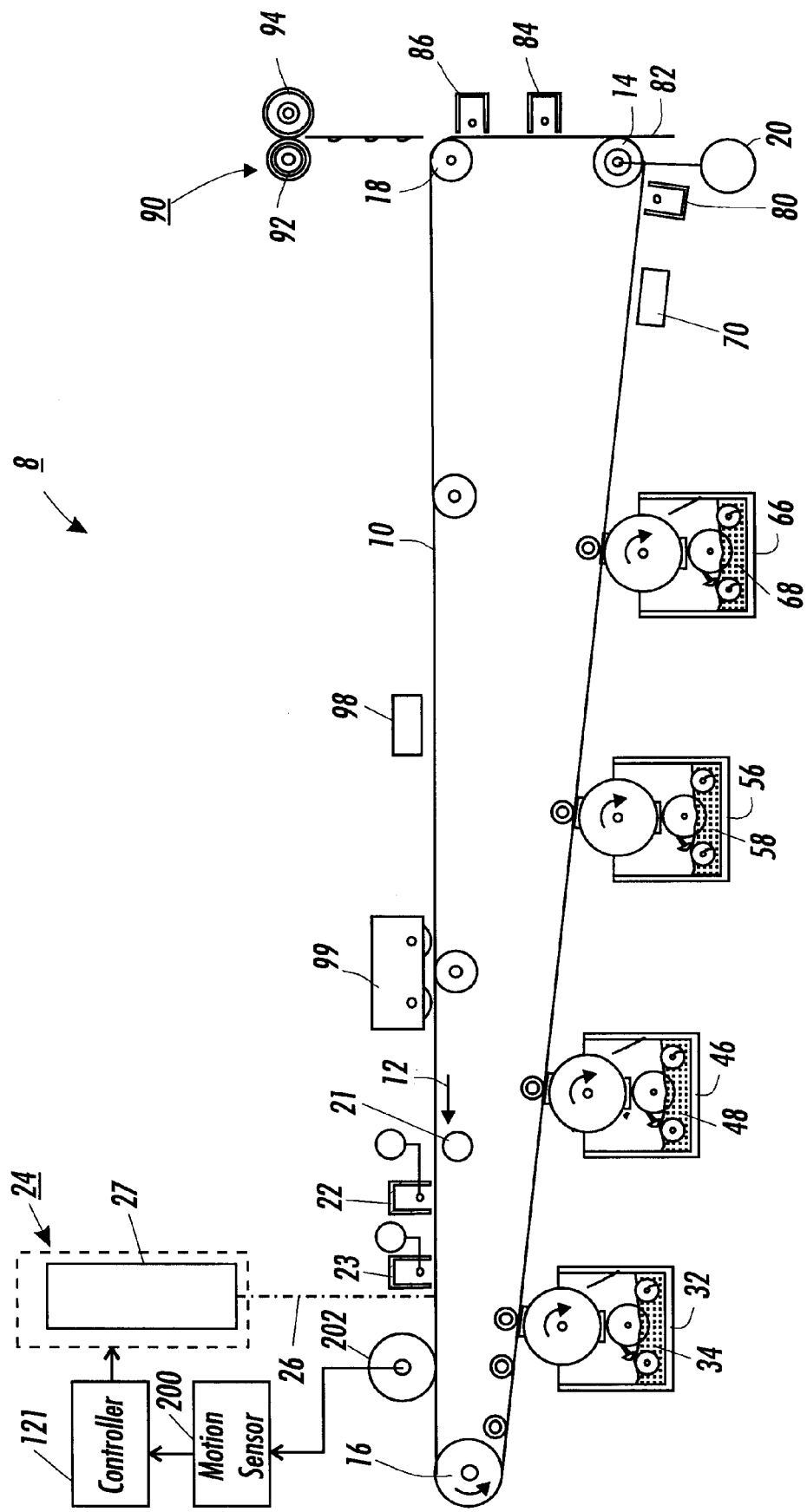
FIG. 1 shows an electrophotographic printing machine that incorporates the principles of the present invention.

FIG. 1 illustrates an electrophotographic printing machine 8 that is in accord with the principles of the present invention. It is to be understood that the present invention can be used in many machines and systems other than that which is specifically illustrated. However, understanding how the present invention is used in the printing machine 8 will assist the understanding of the invention.

The printing machine 8 includes an Active Matrix (AMAT) photoreceptor belt 10 which travels in the direction indicated by the arrow 12. Belt travel is brought about by mounting the photoreceptor belt about a driven roller 14 and tension rollers 16 and 18. The driven roller 14 is driven by a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various toner layers which, after being transferred and fused to a substrate, produce the final color image. While the photoreceptor belt may have numerous image areas, since each image area is processed in the same way a description of the processing of one image area suffices to fully explain the operation of the printing machine.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22 and an AC scorotron 23. During this first pass of the image area through the printing machine 8 the DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below). As is explained subsequently the AC scorotron 23 is used in subsequent passes of the image area through the printing machine 8.

After passing the charging station the image area advances to an exposure station 24. At the exposure station the charged image area is exposed to a modulated laser beam 26 from a raster output scanner 27 that raster scans the image area such that an electrostatic latent representation of a black image is produced. For example, illuminated sections of the image area might be discharged by the beam 26 to about −100 volts. Thus after exposure the image area has a voltage profile comprised of relatively high voltage areas of about −500 volts and of relatively low voltage areas of about −100 volts.

Located near the location of exposure station 24 is a motion sensor 200. While the exact type of motion sensor is not important, one beneficial motion sensor includes a friction wheel 202 that rides on the photoreceptor belt 10. As the belt moves the friction wheel rotates. Inside the friction wheel is a high resolution optical sensor (which is not shown). That sensor outputs motion induced pulses as the photoreceptor advances. By comparing the timing of those pulses with stored information the motion sensor determines position errors between where the image area is and where it should be. It should be noted that sinusoidal errors, caused by mechanical loads and imperfections in the drive output of the motor-, are common.

Figure 2:
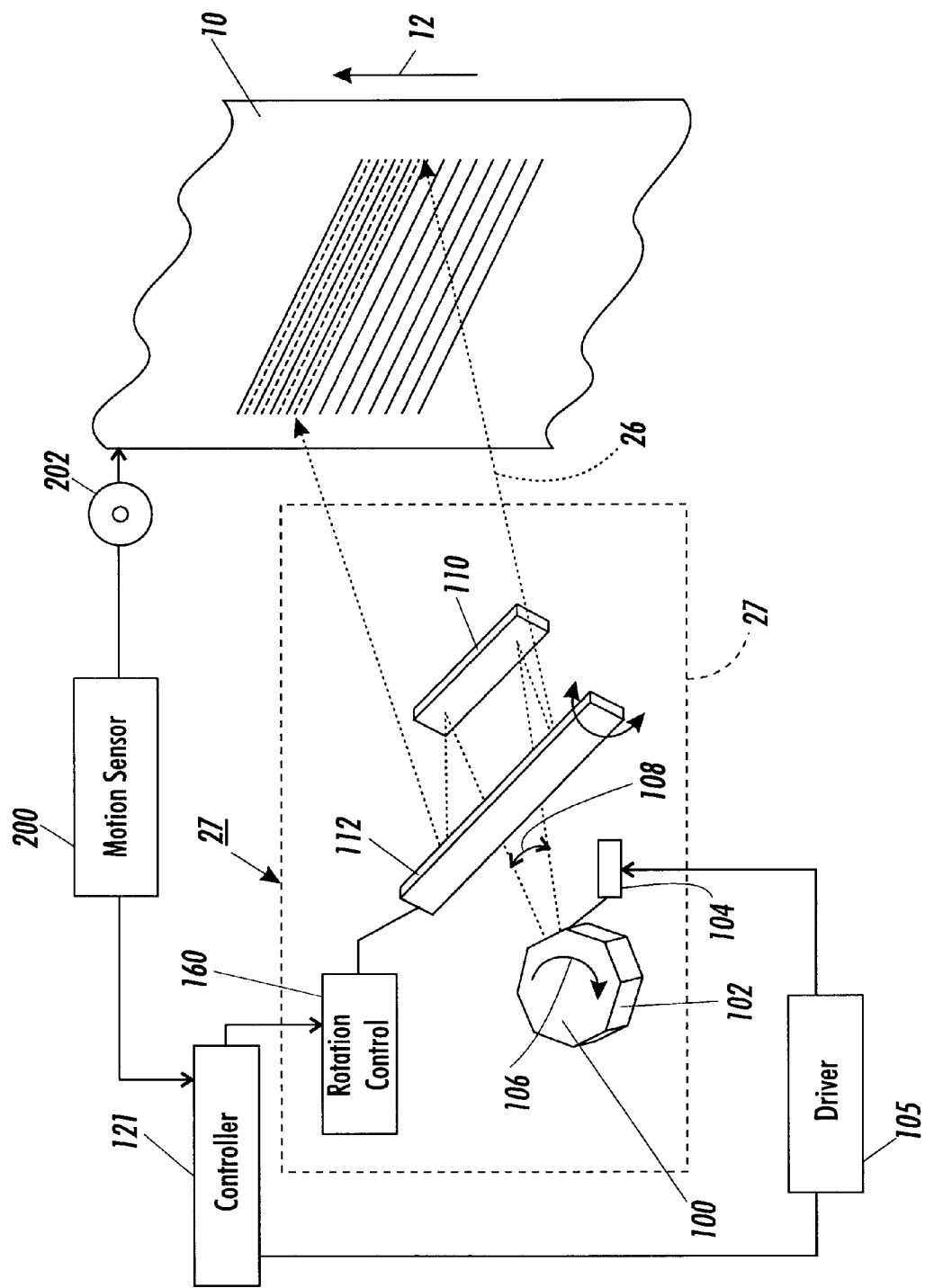
FIG. 2 illustrates the operation of the multifaceted raster output scanner of FIG. 1.

Turning now to FIG. 2, the raster output scanner 24 includes a polygon 100 having a plurality of facets 102. A laser 104 generates the laser beam 26, which is directed toward the polygon facets. Since the polygon 100 rotates in a direction 106 the laser beam 26 sweeps through an angle 108. The sweeping laser beam reflects from a first mirror 110, then from a rotating cylinder mirror 112, and finally the sweeping laser beam produces a scan line on the photoreceptor 10. The polygon 100, laser 104, first mirror 110, and cylinder mirror 112 are all located within the raster output scanner 27.

Referring now to both FIGS. 1 and 2, the motion sensor 200 sends the position error information to a controller 121. That controller also applies modulation signals to a driver 105 that causes the laser 104 to modulate the laser beam 26 in accordance with the modulation signals. Using the position error information, the controller either advances or delays the modulation signals to the driver 105 such that the laser begins scanning the photoreceptor at the correct time to achieve synchronization of the black latent image with the latent images that follow (the production of those images is described subsequently).

However, simply synchronizing the timing of the images might create a scan line offset. To understand this, refer to FIG. 2. As the polygon 100 rotates, if a scan line is not ready to be written at the proper time, the modulation must be advanced or delayed until a facet is properly located (otherwise a scan line might begin after or before the start of scan). Unless the advance or delay of the scan line is compensated for, the image areas will not be registered.

Figure 3:
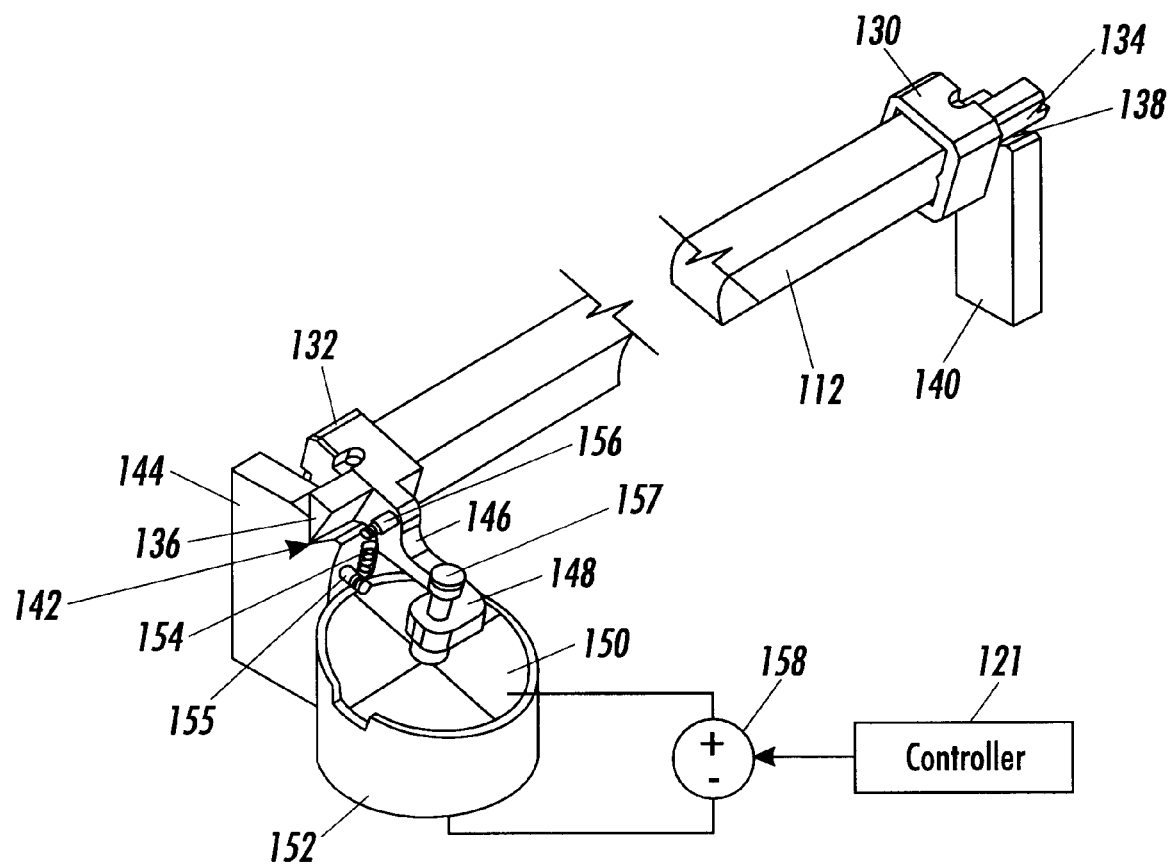
FIG. 3 illustrates a beneficial system for coupling a cylindrical mirror to a piezoelectric cylinder mirror beam mover.

A technique of correcting process direction offsets is described with reference to FIG. 3. End caps 130 and 132 are placed on the ends of the cylindrical mirror 112. The end cap 130 has a knife edge 134 while the end cap 132 has a knife edge 136. The knife edge 134 fits into a notch 138 of a stand 140, and the knife edge 136 fits into a notch 142 of a stand 144. The cylinder mirror thus freely rotates about the notches 138 and 142.

The end cap 132 includes a lever arm 146 that terminates in a threaded coupling 148. Below the threaded coupling is a piezoelectric element 150 in a support 152. A spring 154 stretched between a stand pin 155 and a lever pin 156 biases the lever arm toward the piezoelectric element 150. A screw 157 passing through a threaded coupling contacts the piezoelectric element. By adjusting the screw the pivot of the cylinder mirror can be adjusted.

The controller 121 causes a controlled voltage source 158 to apply a potential to the piezoelectric element. As is well known, a voltage applied to a piezoelectric element causes the piezoelectric element to expand or contract, depending upon the voltage polarity. When the piezoelectric element moves, the cylindrical mirror 112 rotates, thus causing the scan line on the photoreceptor to move in the process direction. By controlling the voltage source, the controller adjusts the position of the scan line on the photoreceptor so as to correct for motion defects of the photoreceptor. The elements 130 through 158 comprise a rotation control assembly 160, shown in FIG. 2.

The axis of rotation of the cylinder mirror 112 is beneficially carefully chosen and controlled. It should run parallel to the axis of formation of the cylinder mirror itself. The axis of rotation of the cylinder mirror should also run tangential to the surface of the cylinder mirror.

Referring once again to FIG. 1, after passing the exposure station 24 the exposed image area with the black latent image passes a black development station 32 that advances black toner 34 onto the image area so as to develop a black latent image. While the black development station 32 could be a magnetic brush developer, a scavengeless developer may be somewhat better. One benefit of scavengeless development is that it does not disturb previously deposited toner layers. Biasing is such as to effect discharged area development (DAD) of the lower (less negative) of the two voltage levels on the photoreceptor. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to the charging station. The DC corotron 22 and the AC scorotron 23 then recharge the image area and its black toner layer using a technique known as split recharging. Split recharging is described in U.S. Pat. No. 5,600,430, which issued on Feb. 4, 1997, and which is entitled, "Split Recharge Method and Apparatus for Color Image Formation." Briefly, the DC corotron overcharges the image are to a voltage level greater than that desired when the image area is recharged, while the AC scorotron reduces that voltage level to that which is desired. Split recharging serves to substantially eliminate voltage differences between toned areas and untoned areas and to reduce the level of residual charge remaining on the previously toned areas. This technique benefits subsequent development by different toners.

The recharged image area with its black toner layer then advances to the exposure station. Using the output of the motion sensor 200, the controller 121 advances or retards the modulation of the laser beam 26 for the next latent image, and adjusts the positions of the scan lines on the photoreceptor by adjusting the voltage output of the controlled voltage source 158 so as to result in registration of the next latent image with the black latent image. At the proper time, the laser beam 26 exposes the image area to produce an electrostatic latent representation of a yellow image.

The now re-exposed image area advances to a yellow development station 46 that deposits yellow toner 48 onto the image area. After passing the yellow development station the image area advances once again to the charging station. There, the DC corotron 22 and the AC scorotron 23 again recharge the image area using split recharging. The recharged image area with its black and yellow toners then advances once again to the exposure station.

Again, using the output of the motion sensor 200, the controller 121 advances or retards the modulation of the laser beam 26 for the next latent image, and adjusts the positions of the scan lines on the photoreceptor by adjusting the voltage output of the controlled voltage source 158 so as to result in registration of the next latent image with the black and yellow latent images. The exposure station then exposes the image area to produce an electrostatic latent representation of a magenta image. After passing the magenta exposure station the now re-exposed image area advances to a magenta development station 56 that deposits magenta toner 58 onto the image area. After passing the magenta development station the image area advances yet again to the charging station where the DC corotron and the AC scorotron split recharge the image area.

The now recharged image area with its black, yellow, and magenta toner layers then advances once again to the exposure station. Again, using the output of the motion sensor 200, the controller 121 advances or retards the modulation of the laser beam 26 for the next latent image, and adjusts the positions of the scan lines on the photoreceptor by adjusting the voltage output of the controlled voltage source 158 so as to result in registration of the next latent image with the black, yellow, and magenta latent images. The station then exposes the image area to produce an electrostatic latent representation of a cyan image.

After passing the exposure station the now re-exposed image area advances past a cyan development station 66 that deposits cyan toner 68 onto the image area. At this time four colors of toner are on the image area, resulting in a composite color image. However, the composite color toner image is comprised of individual toner particles which have charge potentials which vary widely. Directly transferring such a composite toner image onto a substrate would result in a degraded final image. Therefore it is beneficial to prepare the composite color toner image for transfer.

To prepare for transfer a pretransfer erase lamp 70 discharges the image area to produce a relatively low charge level on the image area. The image area then passes a pretransfer DC scorotron 80 which performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate.

As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

Using well known technology the various machine functions described above are generally managed and regulated by the controller 121.

It is to be understood that while the figures and the above description illustrate the present invention, they are exemplary only. Others who are skilled in the applicable arts will recognize numerous modifications and adaptations of the illustrated embodiments which will remain within the principles of the present invention. Therefore, the present invention is to be limited only by the appended claims.

What is claimed:

1. An image forming apparatus, comprising:
   a charged photoreceptor moving in a process direction;
   a motion sensor sensing the motion of the photoreceptor and producing a motion signal;
   a light source emitting a light beam that is modulated in accordance with modulation signals;
   a rotating polygon having a plurality of facets for reflecting the emitted light beam;
   a mounting assembly holding a cylindrical mirror such that said cylindrical mirror is rotatable about an axis, said cylindrical mirror for directing the reflected light beam onto said moving photoreceptor and producing a sweeping spot;
   a rotation inducing element responsive to a position signal, said rotation inducing element causing said mounting assembly to rotate said cylindrical mirror about said axis in response to said position signal such that the sweeping spot moves in the process direction; and
   a controller receiving said motion signal and producing said modulation signals and said position signal;
   wherein said mounting assembly includes a lever arm and a spring, wherein an end of said lever arm contacts said rotation inducing element, and wherein said spring biases said lever arm toward said rotation inducing element; and
   wherein said controller produces said modulation signals and said position signal such that a latent image is produced at a predetermined position.

2. An image forming apparatus according to claim 1, wherein said charged photoreceptor has a developed image, and wherein said latent image is produced such that it is registered with said developed image.

3. An image forming apparatus according to claim 1, wherein said light source is a laser diode.

4. An image forming apparatus according to claim 1, wherein said rotation inducing element includes a piezoelectric element.

5. A color printing machine, comprising:
- a charged photoreceptor moving in a process direction;
- a motion sensor sensing the motion of the photoreceptor and producing motion signals;
- a light source emitting a light beam that is modulated in accordance with modulation signals;
- a rotating polygon having a plurality of facets for reflecting the emitted light beam;
- a pivoting mounting assembly holding a cylindrical mirror such that said cylindrical mirror is rotatable about an axis, said cylindrical mirror for directing the reflected light beam onto said moving photoreceptor thus producing a sweeping spot;
- a controller producing said modulation signals so as to form a first latent image on said photoreceptor;
- a first developing station for depositing toner on said first latent image; and
- a rotation inducing element responsive to a position signal, said rotation inducing element causing said mounting assembly to rotate said cylindrical mirror about said axis in response to said position signal such that the sweeping spot moves in the process direction;
- wherein said mounting assembly includes a lever arm and a spring, wherein an end of said lever arm contacts said rotation inducing element, and wherein said spring biases said lever arm toward said rotation inducing element; and
- wherein said controller receives said motion signals, wherein said controller produces modulation signals such that a second latent image is produced, and wherein said controller produces a position signal such that said second latent image is registered with said first latent image.

6. A color printing machine according to claim 5, further including a second developing station for depositing toner on said second latent image.

7. A color printing machine according to claim 5, further including a transfer station for transferring toner on said first latent image and toner on said second latent image onto a substrate.

8. A color printing machine according to claim 5, further including a fusing station for fusing toner with a substrate.

9. A color printing machine according to claim 5, wherein said light source is a laser diode.

10. A color printing machine according to claim 5, wherein said rotation inducing element includes a piezoelectric element.

* * * * *